May 26, 1931.  M. E. ASADOORIAN  1,807,271

ATTACHMENT FOR FRYING PANS

Filed March 24, 1930

Inventor;
Mariam Asadoorian

By

Patented May 26, 1931

1,807,271

UNITED STATES PATENT OFFICE

MARIAM E. ASADOORIAN, OF PASADENA, CALIFORNIA

ATTACHMENT FOR FRYING PANS

Application filed March 24, 1930. Serial No. 438,469.

The use of a frying pan for frying meat or for frying or cooking any food substance, is usually attended by the spattering of grease in all directions over the stove and onto the person using the frying pan.

It has been proposed heretofore to provide devices adapted for use in connection with a frying pan, whose object is to prevent spattering of the grease when the pan is in use.

My invention relates to this class of frying pan attachments and has for its object the provision of an improved attachment adapted to rest on the stove or heater on which the frying pan is used, and to surround the frying pan and not only prevent the grease from spattering but also to collect and retain the spattered grease, thereby to increase the usefulness of this class of devices.

Other objects are the provision of improved means for accommodating the handle of the frying pan and preventing spraying of the grease through the opening through which the handle extends and, further, to provide improved ventilation openings related to the handle-receiving opening in a novel manner, thus minimizing smoking.

Another object is to provide a device of this character which will have its drum or enclosing part somewhat sloped, being larger at its base than at its top, whereby a plurality of the attachments may be "nested" within each other to minimize the space occupied by a quantity of them when they are packed for shipment and also to facilitate packing them.

A still further object is to provide, in connection with a grease-restraining drum to surround a frying pan, a top or cover of more or less conical shape to facilitate the drainage therefrom of grease spattered thereagainst so that the grease will flow down to the interior of the drum and thence downwardly and be collected by the improved trough or grease collector carried by the drum.

With the foregoing, and other not specifically mentioned, objects in view, the invention embodies those improved features and combinations more fully described in the following specification and shown in the accompanying drawings, in which.

Figure 1:
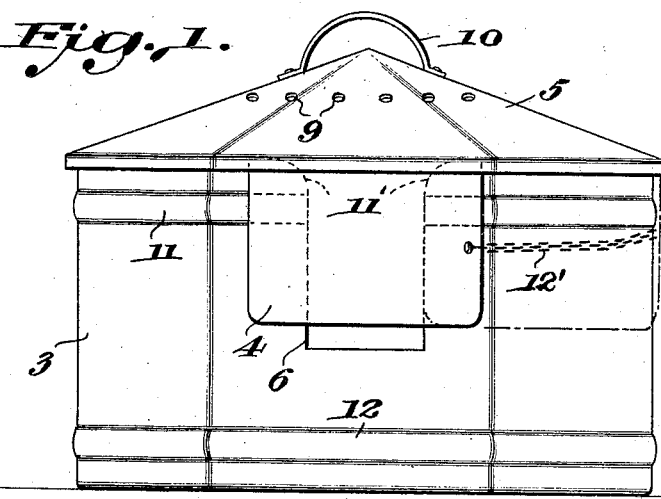
Figure 1 is a side elevation.
Figure 2:
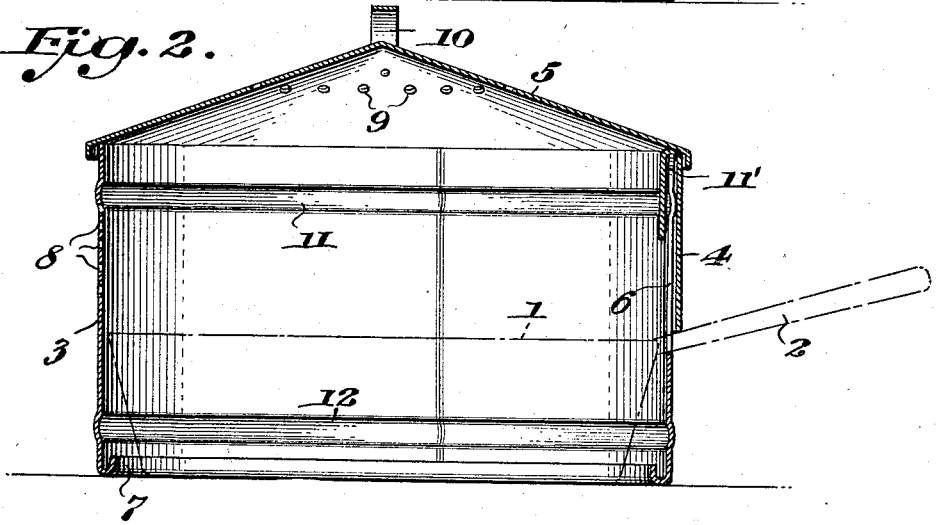
Fig. 2 is a vertical section, dotted lines representing the frying pan.
Figure 3:
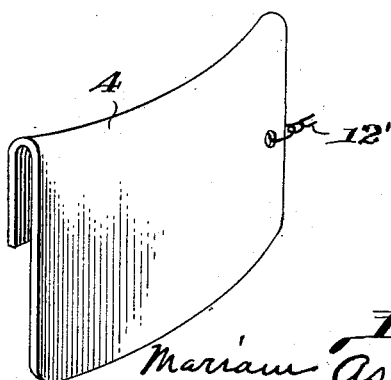
Fig. 3 is a detail view of the closure.

The frying pan, with which the present attachment is adapted to be used, appears at 1, the handle being shown at 2.

My improved grease restraining and collecting attachment comprises a drum 3, a few inches in height and of a diameter slightly greater than that of the frying pan 1; a closure 4, a cover 5, a handle-receiving opening 6, a grease collecting trough 7, ventilating openings 8 and 9 in the drum and cover, respectively, and a handle 10 for the cover, as hereinafter described and shown in the accompanying drawings.

The drum 3 is preferably provided with corrugations 11, 12, to afford proper strength and rigidity and to prevent distortion.

The drum 3 is provided on its inner wall, preferably near or at its lower edge, with the trough 7 which is adapted to catch and retain grease spattered against the inner face of the drum and the underside of the cover, the grease draining down from the drum and cover into said trough. This trough constitutes an important part of the present invention and an improvement over those earlier frying pan attachments which have been intended to confine the grease to the region of the pan. The object of the trough 7 is to prevent grease which would otherwise gravitate down to the lower edge of the drum and fall upon the stove or heater and thus make a disfiguring grease ring, from descending beyond the lower edge of the drum and as the grease is retained in the trough, it is a simple matter to lift the drum from the stove or heater and drain off the collected grease into a suitable receptacle.

The handle 2 is readily entered in the opening 6 because the upper edges of this opening diverge, as indicated at 11'. The closure 4 comprises a single piece of rebent metal whose outer part is of such vertical height that the opening 6 will be closed from the top downwardly to where the lower edge of the closure 4 contacts with the handle 2 of the pan 1, thus minimizing the opportunity for grease to escape through the opening 6. The closure 4 is of the gravity type and can be elevated or lowered to accommodate the particular handle used on the given frying pan that the device is adapted to protect. The closure is also slidable circumferentially on the upper edge of the drum 3 and it is prevented from becoming lost by the provision of any suitable small chain 12' or piece of cord.

Located preferably opposite to the opening 6 is the group of openings 8 so that the circulation of air will be across the top of the frying pan. The cover 5 has a depending flange or lip adapted to fit down over the upper edge of the drum 3, and said cover is preferably somewhat larger in diameter than the drum so that it can be easily placed on said drum and easily removed therefrom without possibility of cramping or sticking, even though the drum gets out of true circular shape.

The cover 5 is of conical shape to facilitate drainage of the grease from its underside to the inner side of the drum. The cover has the ventilating openings 9 to enable the air entering the openings 6 and 8 to pass out from within the drum, minimizing smoking, etc. The handle 10 affords a convenient means for applying or removing the cover so that the progress of frying or cooking may be observed.

The upper edge of the drum may be turned or beaded, if desired; this feature may also be provided at the lower edge of the drum.

What I claim is:

1. An attachment for frying pans comprising a drum adapted for association with a frying pan and provided with an opening in its side extending downwardly from its upper edge and constituting a gap in the said edge adapted to accommodate the handle of the frying pan, and a removable cover for said drum which is adapted for closing the gap at the upper part of said opening.

2. An attachment for frying pans comprising a drum adapted for association with a frying pan and provided with an opening in its side extending downwardly from its upper edge to accommodate the handle of the frying pan, and a combined gravitating and slidable closure carried by the drum, said closure being adapted to be moved sidewise to permit introduction of the frying pan handle in the opening and to be positioned to close the space above the frying pan handle to minimize the size of said opening.

3. A frying pan attachment embodying a drum adapted for association with a frying pan, said drum having on its interior a grease-collecting trough extending all the way therearound, and also provided with an opening leading downwardly from the upper edge of the drum, through which may extend the handle of the frying pan, a slidable closure overlapping, and suspended by, the upper edge of the drum and serving to cover the part of the opening which is to be unoccupied by the handle of the frying pan, and a removable cover for the drum, said cover overlapping said closure.

In testimony whereof I affix my signature.

MARIAM E. ASADOORIAN.